Nov. 11, 1958   E. H. MUMFORD   2,859,559
MEANS FOR DELIVERING FORMED CHARGES OF MOLTEN GLASS TO MOLDS
Original Filed Sept. 28, 1954   2 Sheets-Sheet 1

INVENTOR.
EUSTACE H. MUMFORD
BY
ATTORNEYS

Nov. 11, 1958    E. H. MUMFORD    2,859,559
MEANS FOR DELIVERING FORMED CHARGES OF MOLTEN GLASS TO MOLDS
Original Filed Sept. 28, 1954    2 Sheets-Sheet 2

INVENTOR.
EUSTACE H. MUMFORD
BY
ATTORNEYS

United States Patent Office 2,859,559
Patented Nov. 11, 1958

2,859,559

MEANS FOR DELIVERING FORMED CHARGES OF MOLTEN GLASS TO MOLDS

Eustace H. Mumford, Ottawa Lake, Mich., assignor to Owens-Illinois Glass Company, a corporation of Ohio Continuation of application Serial No. 458,917, September 28, 1954. This application May 27, 1957, Serial No. 661,755

5 Claims. (Cl. 49—14)

My invention relates to an apparatus by which charges of plastic material such as plastic or molten glass, as they are discharged from a feeder, are directed into molds positioned below and at one side of the feeder outlet. The formed charges drop and are carried by gravity into the molds. The invention is particularly adapted for use in the manufacture of hollow glass articles such as bottles, jars, tumblers, and the like, which are blown to hollow form within the molds. In the manufacture of such ware it is customary to drop the mold charges or gobs as they are formed, into an inclined chute or trough. The gobs are carried by gravity down the chute and directed into the open molds. During the passage of a gob along the chute a substantial amount of heat is extracted from the surface in contact with the chute, causing a one-sided chilling of the surface portion of the mold charge. This results in the formation of defective ware. In the manufacture of hollow glassware which is blown in molds it is important to maintain a substantially uniform temperature throughout the lateral surface area of the mold charge. Any one-sided or non-uniform chilling prevents an even distribution of the molten glass when blown in the mold and sometimes prevents the parison from being fully expanded in the mold, resulting in a deformed or imperfect article. The non-uniform chilling of the mold charge also results frequently in the formation of wrinkles or irregularities in the chilled surface portion or skin of glass. This shows up as a defect in the finished ware.

An object of the present invention is to provide apparatus for guiding the mold charges as they drop by gravity from the feeder, and directing them into the molds by a series of guiding surfaces so constructed and arranged that a non-uniform chilling of the major surfaces of the mold charges is prevented.

A further object of the invention is to provide an improved method of directing a formed charge of molten glass as it is delivered from a feeder and guiding it into a mold positioned below and laterally of the feeder, in a manner to avoid excessive lateral pressure of the glass on the guiding surfaces, thereby preventing deformation and uneven chilling of the charge of glass.

Other objects of the invention will appear hereinafter.

Referring to the accompanying drawings.

Figure 1:
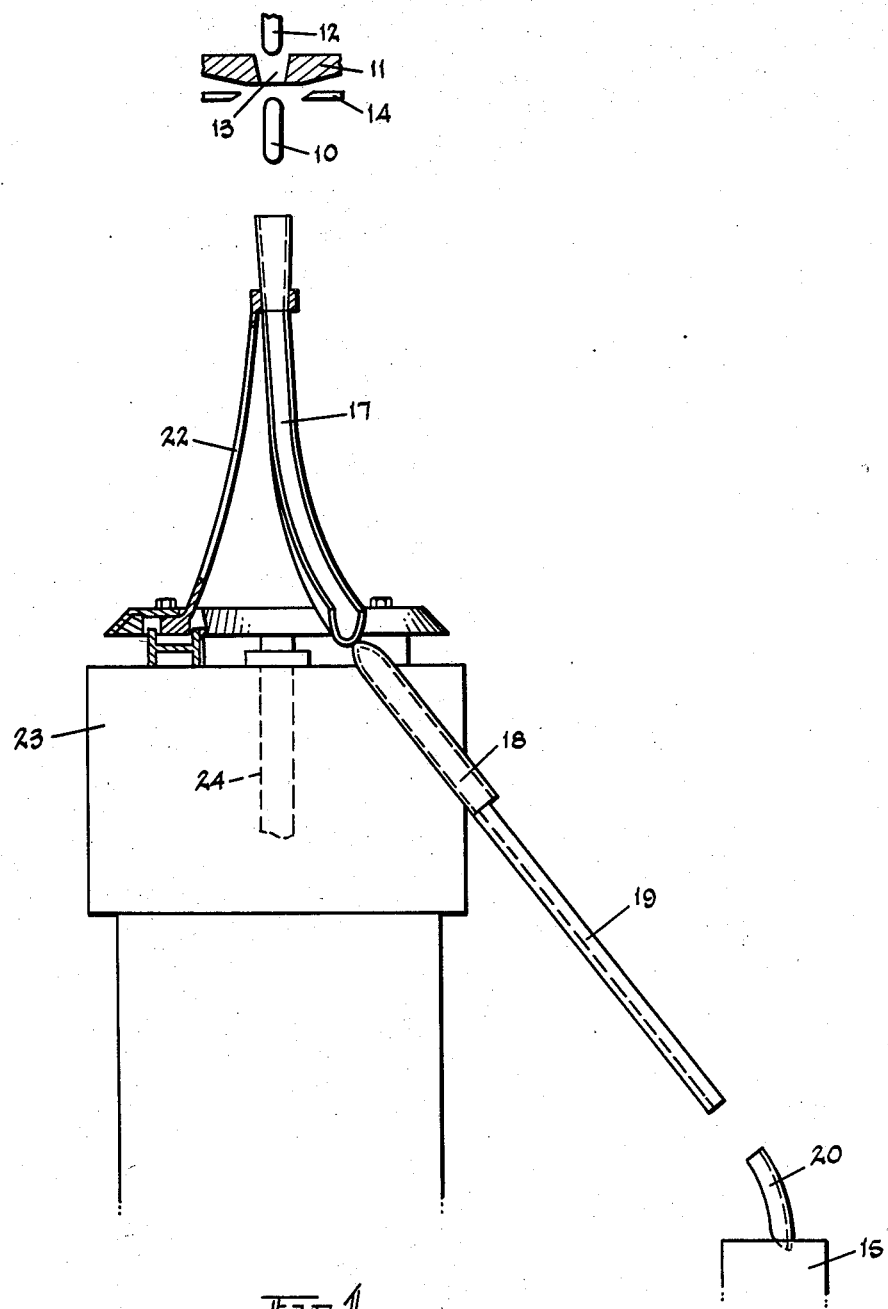
Fig. 1 is a partly diagrammatic elevational view of an apparatus for use in practicing my invention, the view being taken in a direction substantially perpendicular to a vertical plane common to the axes of the feeder and a mold to which the charge is transferred from the feeder.
Figure 2:
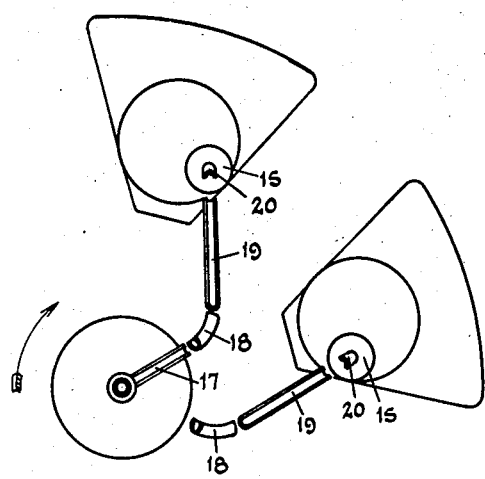
Fig. 2 is a partly diagrammatic plan view of the apparatus.

Referring to Figs. 1 and 2 of the accompanying drawings, mold charges or gobs 10 are formed and discharged from a furnace forehearth 11. The formation of the molten glass into an elongated gob 10 is controlled in part by a feeder plunger 12 which is reciprocated vertically over the outlet 13 opening in the floor of the feeder forehearth. The charges as they issue in elongated form from the outlet are severed by shears 14, permitting them to drop by gravity. The mold charges are directed singly and in succession to molds 15. The molds may be arranged in an annular series concentric with the feeder outlet, two of such molds being shown in Fig. 2. The gobs 10 as they drop by gravity are directed laterally to the offset molds by an offset delivery system in the form of a composite chute or trough comprising a series of separate sections or components. These include an upper rotary trough section 17, a curved stationary chute 18, a straight stationary chute 19, and a curved chute or deflector 20. A plurality of the stationary composite chutes, each comprising chute sections 18, 19, 20, are provided, individual to the molds 16. These are served by a single trough 17.

The upper section or trough 17 is mounted for rotation about a vertical axis extending through the center of the feeder outlet 13. The trough is mounted in a frame 22 carried on a stationary support 23. The frame is rotated continuously by a drive shaft 24 powered by an electric motor, the rotation being in the direction indicated by the arrow, Fig. 2. The upper end portion of the trough 17 is substantially vertical and in alignment with the feeder outlet to receive the gobs 10 as they are severed and drop from the supply body of molten glass. The major portion of the trough 17 is curved downwardly and outwardly so that the lower or discharge end of the trough is brought into register with the stationary curved chutes 18 in succession as the trough rotates. The rotation of the trough is clockwise as viewed in Fig. 2. The drive shaft 24 is rotated continuously at a constant speed and in timed relation to the intermittent operations of the shears 14, the parts being so timed that each gob 10 as it leaves the trough 17 is directed into a chute 18. The gobs are directed in a spiral path by the rotating chute.

Figure 3:
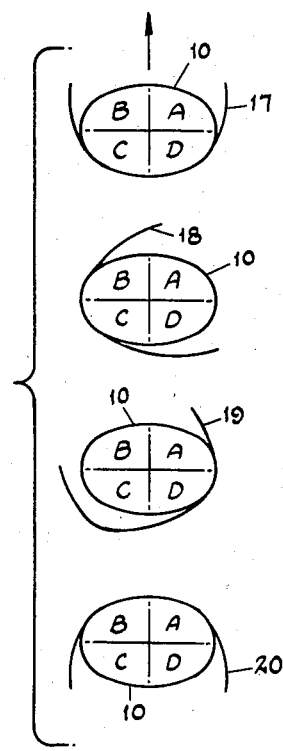
Fig. 3 is a schematic view illustrating the positions of a charge of glass progressively in the several components of the transfer chute during the passage of the mold charge from the feeder to the mold.
Figure 4:
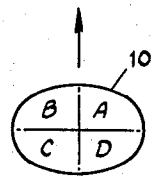
Fig. 4 is a schematic view showing the cross-sectional contour of a mold charge.
Figure 5:
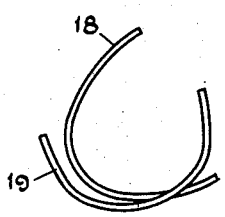
Fig. 5 is a schematic view showing the offset position of one trough section relative to another.

The elongated gob 10 may be circular in cross section, approximately circular or somewhat flattened into an oval shape as indicated diagrammatically in Fig. 4. Pressure of the guiding surfaces has some tendency to flatten the soft, plastic gob. For convenience of illustration and description the gob is indicated as comprised of four quadrants designated respectively A, B, C, and D. Each of the sections or elements 17, 18, 19, and 20 of the composite chute is approximately semi-circular or U-shaped in cross section as indicated schematically in Figs. 3–5.

The gob 10 as it is discharged from the feeder is at a high temperature at which the glass is molten or plastic and deformable by slight pressure applied thereto on any side. The exposure of the glass to the atmospheric air during its transfer to the mold causes a surface chilling by which a thin skin or chilled surface layer is formed. The contact of the glass with the surfaces of the guiding chutes 17—20 causes additional chilling of the surface areas of the glass which are brought in contact with the surface of the chute.

With chutes of conventional form or such as are in general use the surface chilling of the glass by contact with the chute is mainly on one side of the gob. This results in an uneven and excessive surface chilling which produces chill wrinkles in the glass and results in defective ware. The present invention provides a construction in which the composite chute is designed and arranged to distribute the surfaces of contact between the gob and the chutes in a manner to obtain an approximately or substantially uniform surface chilling throughout the circumference or lateral surface area of the gob.

As the gob moves down the rotary trough 17 the quadrants C and D are in contact with the trough as indicated in Fig. 3. As the gob passes from the rotating trough 17 to the stationary curved chute 18 it is moving downward at a rather high velocity and, owing to the inclination of the trough 17 and the centrifugal force, the gob bears with a lateral pressure against the trough 18 which, as viewed in section (Fig. 3), is in a tilted position. The surface contact accordingly is mainly along the quadrants B and C. As the gob passes from the curved chute 18 to the straight chute 19 it is thrown or bears laterally against the right hand portion of the trough, the contact of the trough being with the quadrants D and A. As shown schematically in Fig. 5, the straight chute 19 is offset laterally to the left relative to the chute 18 and thereby produces such one-sided contact between the gob and chute. As the gob travels along the straight stationary chute 19 it gradually settles to the bottom of the chute resulting in a light contact on the quadrants C and D. It will be noted that the quadrants B and C which previously have been in contact with the chute 18, are temporarily out of contact with the chute surface thereby allowing some "reheat," by heat transferred from the interior of the gob. As the gob traverses the deflector 20 the quadrands A and B are in contact with the deflector surface.

It will be seen that the gob during its transfer to the mold is contacted on all its lateral sides, namely, throughout its circumference, by the guiding surfaces of the various chute components. There is thus a substantially or approximately uniform distribution of the surface chilling throughout the entire circumference of the gob. This prevents excessive chilling of any portion of the gob surface and eliminates the usual chill wrinkles produced by one-sided and excessive surface chilling. In this manner surface defects in the finished ware which are due to uneven chilling are avoided and a uniform distribution of the glass is obtained when blown to hollow form in the finishing molds.

It will be observed that the gob is guided in an approximately straight path from the feeder to the mold and that abrupt or wide changes in the direction of travel are avoided. As a result the gob during its transfer bears only lightly on the guiding surfaces of the chute sections thus minimizing the chilling effect and also preventing distortion of the gob.

The present application discloses subject matter disclosed in my copending application Serial Number 454,000, filed September 3, 1954, entitled Means for Directing Charges of Molten Glass into Molds, now Patent 2,810,236, dated October 22, 1957.

The foregoing constitutes the complete specification of my copending application Serial Number 458,917, filed September 28, 1954 (now abandoned), and this present application is a continuation thereof.

Modifications may be resorted to within the spirit and scope of the appended claims.

I claim:

1. Apparatus for forming elongated gobs of molten glass and transferring them by gravity from a forming station to a delivery station positioned below and laterally of the forming station, said apparatus comprising means for suspending and releasing a gob at the forming station, permitting it to drop, a chute mounted for rotation about a vertical axis aligned with the center of said gob suspending and releasing means, means for rotating the chute about said axis, said chute being spaced below the suspended gob and having its upper end portion in vertical register with the suspended gob, the lower portion of the chute being downwardly and outwardly inclined, a stationary chute section mounted below the rotary chute in position for the rotary chute to be brought into register with the stationary chute during its rotation, said stationary chute extending lengthwise in a downwardly and outwardly inclined plane and having a guiding surface curved lengthwise thereof in said inclined plane and by which the gob is directed in a curved path along said plane and its direction of travel changed, the said guiding surface being substantially U-shaped in cross section and thereby providing a guiding surface conforming to the curved surface of the gob as the latter travels through the chute, a second stationary chute extending in a straight line in said inclined plane and positioned below and in register with said curved stationary chute, said rotary and stationary chutes being spaced and arranged to successively engage lateral surface portions of the gob progressively with said surface portions extending substantially the full length of the gob and distributed circumferentially of the gob, said apparatus including a deflector positioned below and in register with said straight inclined chute in position to receive the gob as it is discharged from said straight inclined chute, said deflector having a curved guiding surface positioned to deflect and guide the gob from an inclined direction to a vertical direction at the delivery station, the deflector being of inverted U-shape in transverse cross section and negatively curved longitudinally, a substantial portion of the U-shape curvature being the same as the curvature of the surface of the gob in transverse section.

2. The apparatus defined in claim 1, including a plurality of composite chutes each of the same construction as that defined in claim 1, each including a curved stationary chute, a straight stationary chute and a deflector, said composite chutes being positioned and spaced at intervals in an annular series concentric with the said vertical axis, the rotary chute being brought in succession into register with said stationary composite chutes during its rotation.

3. Apparatus for delivering gobs of molten glass by gravity from a gob forming station to a mold positioned below and laterally of the forming station, said apparatus comprising means for releasing and dropping a suspended gob, a chute mounted for rotation about a vertical axis aligned with the center of said gob releasing means, means for rotating the chute about said axis, said chute being spaced below the suspended gob and having its upper end portion in vertical register with the suspended gob, the lower portion of the chute being downwardly and outwardly inclined, a stationary chute section mounted below said rotary chute and in position of register therewith, said stationary chute extending lengthwise in a downwardly and outwardly inclined plane and having a guiding surface curved lengthwise thereof in said inclined plane and by which the gob is directed in a curved path along said plane and its direction of travel changed, the said guiding surface being substantially U-shape in cross section and thereby providing a guiding surface conforming to the curved surface of the gob as the latter travels through the chute, a second stationary chute extending outwardly and downwardly from said first chute and in said inclined plane and positioned below and in register with said curved stationary chute, a deflector chute positioned below and in register with said last mentioned inclined chute in position to receive the gob as it is discharged from said last inclined chute, said deflector having a curved guiding surface positioned to deflect and guide the gob from an inclined direction to a vertical direction at the delivery station, the deflector being of inverted U-shape in transverse cross section and negatively curved longitudinally, a substantial portion of the U-shape curvature being the same as the curvature of the surface of the gob in transverse section, said rotary, stationary and deflector chutes being so spaced and arranged as to successively engage lateral surface portions of the gob progressively with said surface portions extending substantially the full length of the gob and distributed circumferentially of the gob.

4. The apparatus defined in claim 3, including a plurality of composite chutes each of the same construction as that defined in claim 3, each including a curved stationary chute, a deflector chute, and an interconnecting chute, said composite chutes being positioned and spaced at intervals in an annular series concentric with the said vertical axis, the rotary chute being brought in succession into register with each said stationary composite chutes during its rotation.

5. Apparatus for forming elongated gobs of molten glass and transferring them by gravity from a forming station to a delivery station positioned below the gob forming station, said apparatus comprising means for suspending and releasing a gob at the forming station, permitting it to drop, a chute mounted for rotation about a vertical axis aligned with the center of said gob suspending and releasing means, means for rotating the chute about said axis, said chute being spaced below the suspended gob and having its upper end portion in vertical register with the suspended gob, the lower portion of the chute being downwardly and outwardly inclined, a stationary chute section mounted below the rotary chute in position for the rotary chute to be brought into register with the stationary chute during its rotation, said stationary chute extending lengthwise in a downwardly and outwardly inclined plane and having a guiding surface curved lengthwise thereof in said inclined plane and by which the gob is directed in a curved path along said plane and its direction of travel changed, a second stationary chute extending in a straight line in said inclined plane and positioned below and in register with said curved stationary chute, said rotary and stationary chutes each being U-shaped in cross section and being spaced and arranged to successively engage different circumferentially spaced surface portions of the gob in progression, said apparatus including a terminal deflector positioned below and in register with said straight inclined chute in position to receive the gob as it is discharged from said straight inclined chute, said deflector having a curved guiding surface positioned to deflect and guide the gob from an inclined direction to a vertical direction at the delivery station, the deflector being of inverted U-shape in transverse cross-section and negatively curved longitudinally to engage a circumferential gob portion not engaged by any one of said chutes.

References Cited in the file of this patent

UNITED STATES PATENTS

| | | |
|---|---|---|
| 1,231,610 | Howard | July 3, 1917 |
| 2,019,048 | Hellmers et al. | Oct. 29, 1935 |
| 2,073,573 | Steimer | Mar. 9, 1937 |
| 2,293,860 | Sloan | Aug. 25, 1942 |
| 2,301,134 | Meyers | Nov. 3, 1942 |
| 2,512,811 | Schuck | June 27, 1950 |
| 2,598,955 | Winder | June 3, 1952 |
| 2,758,421 | Smith | Aug. 14, 1956 |